United States Patent [19]

Pudel

[11] Patent Number: 4,930,813

[45] Date of Patent: Jun. 5, 1990

[54] RECIPE COLLECTION FOR COMPILING MENUS

[76] Inventor: Volker Pudel, Max-Born-Ring 39, 3400 Göttingen, Fed. Rep. of Germany

[21] Appl. No.: 243,406

[22] Filed: Sep. 12, 1988

[30] Foreign Application Priority Data

Sep. 17, 1987 [DE] Fed. Rep. of Germany ....... 3731213

[51] Int. Cl.[5] ........................ B42F 21/00; B42F 21/02; B42F 17/00; A23L 1/00

[52] U.S. Cl. ........................................ 283/39; 283/37; 283/36; 426/804

[58] Field of Search ........................ 283/35, 36, 37, 39, 283/60 A; 40/70, 359, 360; 426/804, 508, 509

[56] References Cited

U.S. PATENT DOCUMENTS

| | | | |
|---|---|---|---|
| 4,247,999 | 2/1981 | Latino | 283/36 |
| 4,345,396 | 8/1982 | Janssen | 283/36 |
| 4,451,490 | 5/1984 | Silverman et al. | 426/804 |
| 4,461,782 | 7/1984 | Robbins et al. | 426/804 |
| 4,550,934 | 11/1985 | Goossen | 283/37 |
| 4,572,547 | 2/1986 | Phillips | 283/36 |
| 4,696,491 | 9/1987 | Stenger | 283/37 |
| 4,715,621 | 12/1987 | Colavito et al. | 283/36 |

FOREIGN PATENT DOCUMENTS

| | | | |
|---|---|---|---|
| 86029 | 7/1920 | Switzerland | 283/37 |

*Primary Examiner*—Douglas D. Watts
*Assistant Examiner*—Paul M. Heyrana
*Attorney, Agent, or Firm*—Thomas & Kennedy

[57] ABSTRACT

A recipe collection for compiling menus is equipped with a large number of cards of the same format (1, 12, 16) which have on their upper edge (2) at least one tab (4) to be used for sorting purposes and on the surface of the card menu components, ingredients and instructions for their preparation. Each card (1, 12, 16) has in the region of its tab (4) an edge-sealed opening (5) which is arranged in alignment with openings of additional cards. Each card has a distance marker (9, 10, 11) according to its calorie content of the menu component or ingredient in each case in a scale allocated to the total length of the card.

8 Claims, 2 Drawing Sheets

1/2

RECIPE COLLECTION FOR COMPILING MENUS

The invention relates to a recipe collection for compiling menus, having a large number of cards of the same format, which have on their upper edge at least one tab to be used for sorting purposes, a continuation strip or the like and on the surface of the card menu components, ingredients and instructions on their preparation. Such a recipe collection consists of a large number of individual cards, which have the same size and can be arranged loose one behind the other, for example in a filing box or the like. The recipes can be both cooking recipes and baking recipes and recipes for mixing drinks and the like.

The individual cards of known recipe collections have along their upper edge one or more cut out tabs and continuation strips and the like which are used for sorting purposes. With the aid of these tabs or continuation strips, the individual recipes can be arranged one after the other located and also refiled in the back of cards. With this arrangement, a certain sequence must be followed so that accessibility and a clear view are guaranteed. Often, each individual card contains a complete menu and instructions on the ingredients to be used and their preparation. A menu is understood to be a sequence of dishes taken at a particular time, for example in the course of one day and which is regarded as belonging together, for example consisting of soup, entre, main course and desert. A menu component is understood to be the individual ingredient for example of a main course, for example the meat portion on the one hand and the accompaniments on the other hand. Recipe collections known until now are frequently constructed in such a way that a main course and a dessert can be chosen together, an interchange of accompaniments according to the recipe not being provided. This limits the possibility of arrangement in choosing the individual components of the menu. In addition, such a menu compilation makes it difficult to put together the menu in a calorie conscious manner. In order to achieve the appropriate result, tables and other aids which must be used in addition to the recipe collection have helped here until now. Such calorie tables are, however, often not used, whether out of laziness or for other reasons. It is also very difficult to calculate the change in the amount of the appropriate ingredient or menu component such that a certain total calorie count of a menu is observed or not exceeded.

The object of the invention is to perfect a recipe collection of the type described at the outset such that it can be operated in a simple and calorie conscious manner, in which arrangement the possibility should exist to select individual menu components and/or ingredients such that a set total calorie count is not exceeded. It should also be possible to use the recipe collection even if the individual cards are not arranged in a previously set sequence.

According to the invention, this is achieved in that each card has an edge-sealed opening in the region of its tab, which opening is arranged in alignment with openings of other cards, and that each card has a distance marker according to its calorie content of the appropriate menu component or menu ingredient in a scale allocated to the total length of the card. By means of the edge-sealed openings of the tabs of the cards it is possible to select a number of cards with common features from the total stack of cards, independently of the sequence in which the cards are arranged in the stack. For this purpose it is only necessary, to push for example a knitting needle or another pin shaped article through the aligned edge-sealed openings one after the other in the stack of cards and to pull out the appropriate cards upwards from the stack. In this manner, for example, all such cards which display pork dishes, can have a tab with an edge-sealed opening at the same point. It is accepted that different cards corresponding to the menu component of vegetables in turn have corresponding tabs and so on. However each individual card has in addition one distance marker which corresponds to the calorie content of the menu component or ingredient in each case. In this arrangement, not only is a corresponding scale for interpreting the calorie count selected for the stack of cards, but also this scale is further allocated to the total length of the card. For example, the scale is selected in such a manner that the total length of the card corresponds to 600 calories. The individual cards of a selected menu can thereby be arranged next to one another in the longitudinal direction according to the principle of distance summation such that a total length results from the individual distance markers. In this arrangement the cards must be arranged such that for example the appropriate calorie limit, for example 600 calories, is observed. If, when the cards are put together, there results a greater total length than the total calorie count provided for, then either a menu components must be removed or the portion of one or more menu components must be made smaller.

Each card may have several distance markers according to the different portion sizes of the menu components or ingredient which can be subdivided for example into small, medium or large. It is thereby possible to choose a somewhat smaller accompaniment menu component, for example, in order to perhaps increase the dessert, within the total calorie count, or vice versa. The individual menu components must by no means be made together in corresponding portion size in each case, the possibility of variation is provided here too. It is accepted that each card can have instructions on the associated starting weights and handling time for the appropriate portion sizes.

In order to make it possible to identify more easily similar portion sizes, where the allocation of which to one another is considered to be advantageous according to average opinion, the distance markers of similar portion sizes can be underlaid in the same color. This also facilitates handling.

In addition, each card can have a color coding according to the composability of the menu component or ingredient in each case. It is meant by this that certain accompaniments, for example vegetables, go particularly well, but other types of vegetables go less well with a certain menu components, for example a beef dish. A color coding on each card can then indicate the composability so that a compiled menu than has the same color coding. This also makes handling easier.

Each card can have several distance markers running in different directions, the distance markers running different directions having a scale different in each case—relative to the size of the card. Thus, for example, a first group of distance markers can be arranged parallel to the longitudinal side of the cards and a second group parallel to the other side of the cards, the scale allocated to the longitudinal side indicating for example a total of 600 calories, with the scale to the transverse side indicating for example 800 calories. It is also possible to indicate the nutrition content instead of the calorie content.

It is also possible to provide on individual cards several tabs each having an edge-sealed opening, so that in this manner accompaniments can be described as being suitable both for a menu component of beef and also for a menu component of pork.

To make use of the recipe collection easier, a guide card can be allocated to the cards which has instructions on the tabs according to the menu components or ingredients. With the aid of this guide card it is possible to select a first menu component by preference, for example a first menu component of poultry in order then to choose the accompaniments thereafter. Of course it is also possible vice versa to start from a certain accompaniment, for example cauliflower, and then in reverse to select a certain meat component and further accompaniments.

The invention will be further illustrated and described with the aid of several exemplary embodiments in which.

Figure 1:
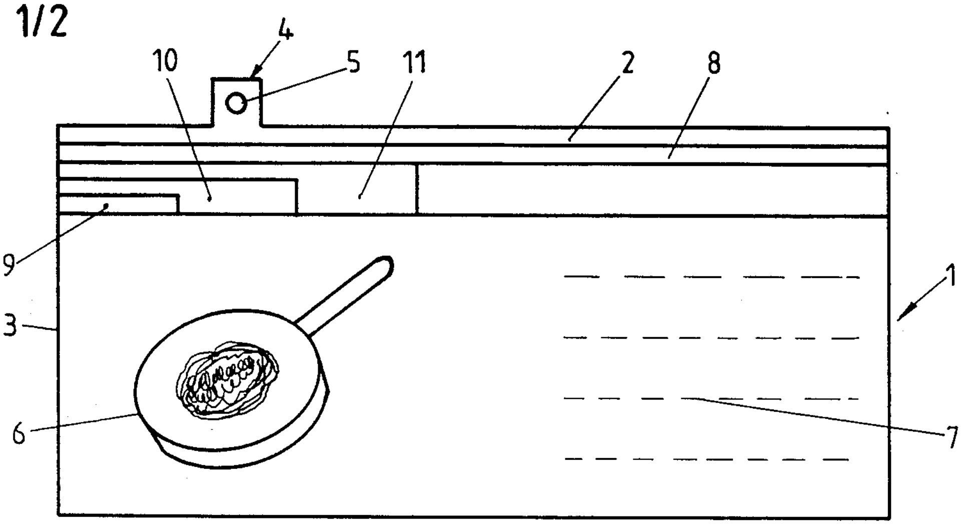
FIG. 1 shows a plan view of a first card of a recipe collection.

The card 1 illustrated in FIG. 1 has a specific length and width format size. All cards of a recipe collection shall correspond to this size. Each card has an upper edge 2 and a transverse edge 3. A tab 4 is arranged or cut out at the upper edge 2 (in the individual cards 1 in each case at a different or even corresponding position), which tab is constructed in one piece from the material of the card. The card 1 may consist of paper, plastic or the like. The tab 4 extends above the upper edge 2 and has an edge-sealed opening 5 which may be in the form of a circle or square. A particular form of these edge-sealed openings 5 is immaterial. The arrangement of the tabs 4 with the openings 5 is arranged in a certain layout distributed over all cards 1 of a recipe collection, so that if the cards are in a stack, the tabs 4 with the openings 5 of the different cards are aligned with one another and on the contrary the other cards are not aligned. In this manner, all cards 1, which show for example a pork dish, can carry the appropriate tab 4 with the opening 5 at the same position. In this way it is possible to grasp and sort out in one go all those cards which show a pork disk, by pushing for example a knitting needle or another pin shaped article through the aligned openings 5 of the relevant cards in the card stack. The appropriate desired card is then chosen. The card in each card contains for example a pictorial representation 6 of the appropriate menu component and details 7 on starting weights, instructions for preparation etc. Each card 1 carries, preferably in the region of the upper edge 2, a color coding 8, that is a continuous stripe of a specific color, from which the user can detect whether and to what extent a specific accompaniment to a particular meat dish is suitable or not in the case of corresponding color stripes.

In addition, the calories of the relevant menu component, in this case by portion, are indicated on the card 1. A first distance marker 9 is allocated to a small portion, another distance marker 10 to a medium sized portion and finally a distance marker 11 to a larger portion of the appropriate menu component. The individual distance markers 9, 10. 11 do not have to be in whole-number multiples, but can be coordinated with the appropriate portion size. The different distance markers 9, 10 11 of different cards can be underlaid with the same color in each case, so that all small portions can be underlaid for example in yellow, medium sized portions in red and all large portions in blue.

Figure 2:
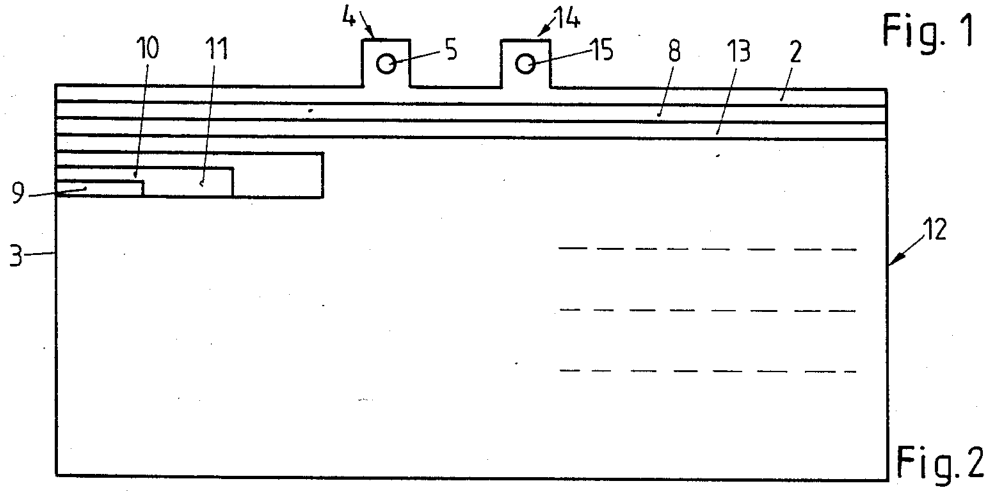
FIG. 2 shows a plan view of a second card of the recipe collection.

FIG. 2 illustrates a card 12 which shows a certain vegetable accompaniment, for example cauliflower. Two color codings 8 and 13 are provided here and there are also two tabs 4, 14 with appropriate openings 5, 15 at the upper edge 2. Once again, distance markers 9, 10, 11 indicate the caloric content of the different portion sizes of this accompaniment as distances.

Figure 3:
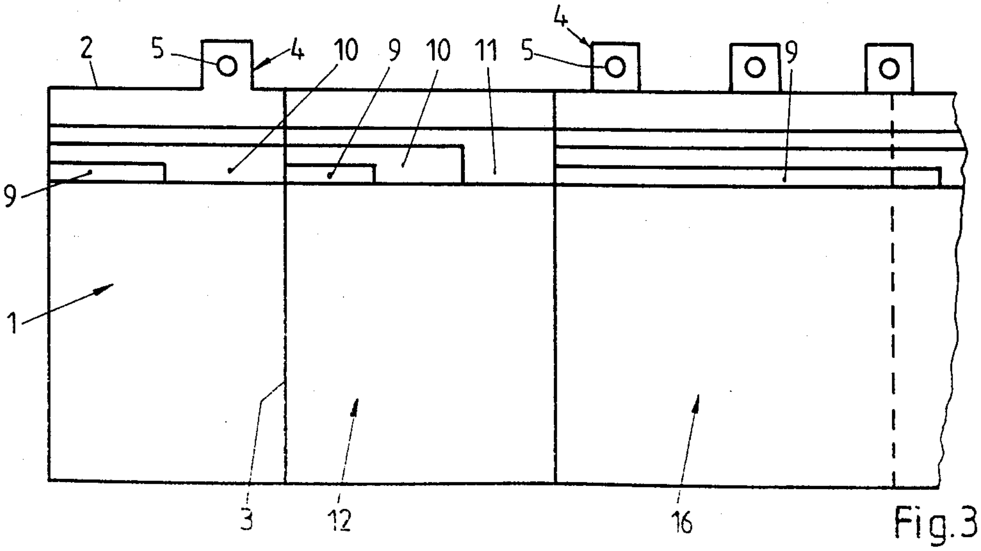
FIG. 3 shows the calorie-conscious use of the cards together.

Use of the cards will be explained with the aid of FIG. 5. After for example the meat component has been chosen according to card 1 in FIG. 1 and the user has selected a medium sized meat portion according to the distance marker 10, the transverse edge 3 of the card 12 with the selected accompaniment is placed on the card 1 in such a way that the card 12 coincides with the edge of the distance marker 10 of the card 1 or is adjacent to the latter. The total calorie count of the menu compiled until now can be seen immediately from this visual summation of calories. If for example a further accompaniment or a dessert or the like is selected, that is if a card 16 is added in a similar manner, then even a small portion according to the end of its distance marker 9 projects beyond the end of card 1 in the example illustrated in FIG. 3. If the scale is selected in such a manner that the total length of the cards 1, 12 and 16 is allocated for example to the calorie quantity of 600 calories, which is suitable for example for a slimming diet, it is recognised that even a small portion of dessert would exceed the limit value set, so that it is necessary to correspondingly reduce the portion size of the accompaniment according to card 12 and/or the portion size of the meat component according to card 1. In this manner, the recipe collection can be handled very simply and used in a calorie-conscious manner. However, the possibilities of variation in compilation are largely limitless and can be handled quite individually according to the requirements and the desires of the user. In FIG. 3, presentation of the color codings 8, 13 etc. has been omitted for reasons of clarity. After taking out the menus or preparation, the cards can be replaced in the stack of cards in an unordered manner, that is in any position. This does not harm further use at all.

Figure 4:
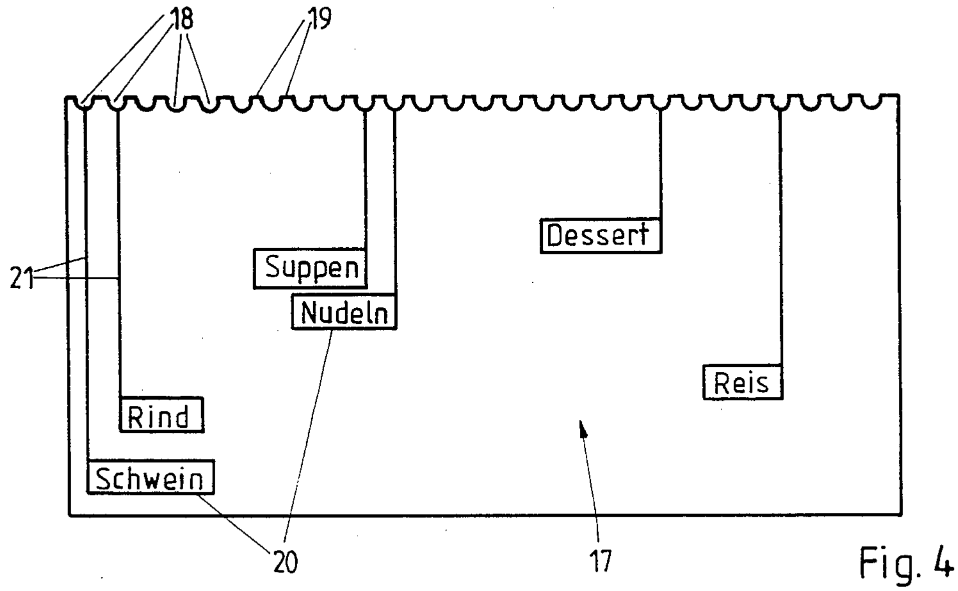
FIG. 4 shows a plan view of a guide card.

A guide card 17 is advantageously allocated to the stack, as illustrated in FIG. 4. This card has recesses 18 open at the edges, which are arranged along their upper edge 19 in the longitudinal direction in the same layout as the tabs 4 and the openings 5 and the tabs 14 with openings 15. The guide card contains various fields 20 with different semantic contents which refer to appropriate recesses 18. For example, reference to pork can be found in a field 20 so that the knitting needle can be used in the appropriate recess 18 which in turn aligns with the openings 5. The same applies to all accompaniments, soups, entres and desserts. The guides 21 running from the fields 20 to the recesses 18 can be constructed in color according to the color coding 8, 13, so that a reference to composability and compatibility of the appropriate components is already given by means of the guide card 17.

Figure 5:
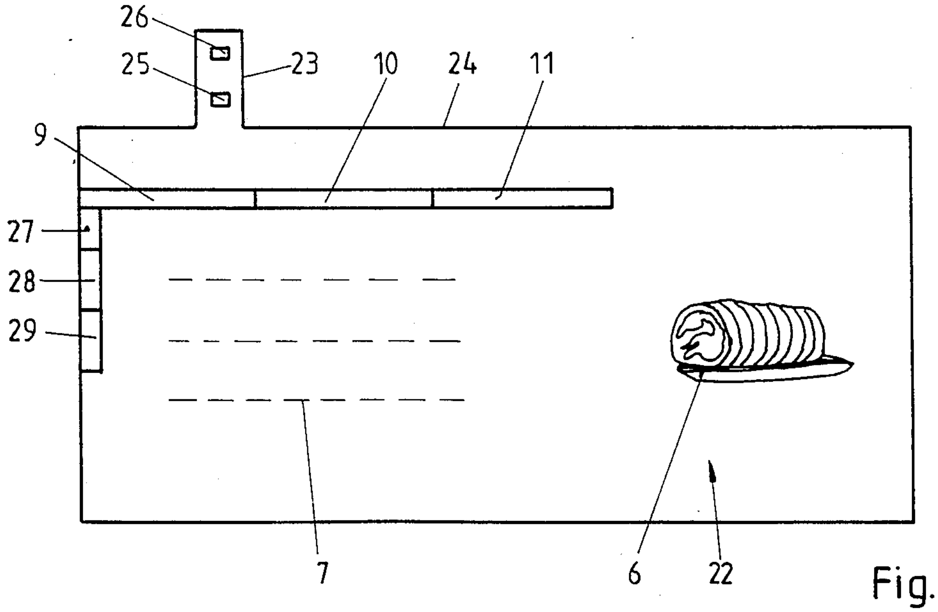
FIG. 5 shows a further plan view of a further embodiment of a card.

FIG. 5 shows a further card 22 in a different embodiment. Here there are provided longer tabs 23 at a distance from the upper edge 24, which have two edge-sealed openings 25 and 26 which enable an even subdivision of certain menu components. It is accepted that shorter tabs which have in turn only one edge-sealed opening in alignment with the opening 25, belong to such a stack of cards. The card 22 has distance markers 9, 10 and 11 in the one direction, that is parallel to the upper edge and other distance markers 27, 28, 29 in a different direction, that is parallel to a transverse edge 30. In this arrangement, the scales are chosen differently relative to the total length or the relevant height, so that one direction can be used for example for a slimming diet and the other scale for a normal diet, a specific diet or the like. Otherwise, the cards 22 also correspond with their representations 6 and details 7 in the manner already illustrated.

List of Reference Designations

1=Card
2=Upper edge
3=Transverse edge
4=Tab
5=Opening
6=Representation
7=Details
8=Color coding
9=Distance marker
10=Distance marker
11=Distance marker
12=Card
13=Color coding
14=Tab
15=Opening
16=Card
17=Guide card
18=Recess
19=Upper edge
20=Field
21=Guide
22=Card
23=Tab
24=Upper edge
25=Opening
26=Opening
27=Distance marker
28=Distance marker
29=Distance marker
30=Transverse edge

I claim:

1. A system for compiling menus and the like, comprising a collection of cards of the same format with each of said cards having a menu component disclosed thereon with said cards each having an upper edge portion, said cards each including on their upper edge portion at least one upwardly extending tab to be used for sorting purposes, each card bearing a stripe of a certain color with the color indicating that the menu component of the card is usually considered to be taste compatible with a meat disclosed on another card identified by the same or a compatible color, wherein said card (1, 12, 15, 22) includes ingredients and instructions for the preparation of each menu component thereon, and edge sealed opening (5, 15) in the region of the tab of each card, which is arranged in alignment with openings (5, 15) of other cards in the collection of cards with the cards which have aligned openings bearing menu components that are usually considered to be taste compatible, and a scale imprinted on each card with the size of the scale corresponding to the number of calories or the like contained in the menu component of the card whereby the scales of a selection of cards can be placed adjacent one another to visually indicate the number of calories to be present in a collection of menu components.

2. A system for compiling menus as claimed in claim 1, wherein each card (1, 12, 16, 22) includes several scales, arranged on each card according to different portion sizes of the menu component or ingredient.

3. A system for compiling menus as claimed in claim 2, wherein the scales (9, 10, 11) on the cards showing the caloric content or the like of the same size portions of the menu components on the cards are underlaid in the same color.

4. A system for compiling menus as claimed in claim 3, wherein each card (1, 12, 16, 22) has a color coding (8,13) according to the taste compatibility of a menu component on a card with the menu components of other cards in the collection.

5. A system for compiling menus as claimed in 3, wherein the scale of each card (22) comprises at least a pair of scales (9, 10, 11; 27, 28, 29) running in different directions, wherein the scales running in different directions each have different measuring distances for indicating the caloric content or the like of each portion of a menu component of a card relative to the size of the card (22).

6. A system for compiling menus as claimed in claim 5, wherein several tabs (4, 14) each having an edge-sealed opening (5, 15) are provided on selected cards (12).

7. A as claimed in claim 6, wherein said selection of cards includes a guide card (17) wherein the guide card has instructions on the use of the tabs (4, 14) for locating a desired card having a particular menu component or ingredients.

8. A system for compiling menus or the like, comprising a collection of cards of the same format, each card having a menu component disclosed thereon, and each card bearing a distinctively colored stripe with the color of the stripe indicating taste compatibility of the menu component with a selected meat disclosed on another card and identified by the same or a compatible color, wherein each card includes ingredients and instructions for the preparation of each menu component and each card being imprinted. with a scale of a dimension corresponding to the nutritional content of the menu component disclosed upon each card whereby the linear scales of a selection of cards can be placed in abutment with one another to visually indicate the nutritional content present in a collection of menu components.

* * * * *